United States Patent
Bergström et al.

(10) Patent No.: US 10,390,303 B2
(45) Date of Patent: Aug. 20, 2019

(54) METHODS AND APPARATUS FOR CONFIGURING A DISCONTINUOUS RECEPTION MODE IN A WIRELESS NETWORK

(71) Applicant: Telefonaktiebolaget LM Ericsson (publ), Stockholm (SE)

(72) Inventors: Mattias Bergström, Stockholm (SE); Mikael Wittberg, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/543,432

(22) PCT Filed: May 19, 2017

(86) PCT No.: PCT/SE2017/050529
§ 371 (c)(1),
(2) Date: Jul. 13, 2017

(87) PCT Pub. No.: WO2017/204726
PCT Pub. Date: Nov. 30, 2017

(65) Prior Publication Data
US 2018/0220366 A1    Aug. 2, 2018

Related U.S. Application Data

(60) Provisional application No. 62/340,851, filed on May 24, 2016.

(51) Int. Cl.
*H04W 52/02*    (2009.01)
*H04W 76/28*    (2018.01)
*H04W 52/10*    (2009.01)

(52) U.S. Cl.
CPC ....... *H04W 52/0216* (2013.01); *H04W 76/28* (2018.02); *Y02D 70/122* (2018.01);
(Continued)

(58) Field of Classification Search
CPC .......................... H04W 52/0225; H04W 76/28
(Continued)

(56) References Cited

U.S. PATENT DOCUMENTS

2007/0259673 A1    11/2007  Willars et al.
2010/0322173 A1*   12/2010  Marinier ............ H04W 76/048
                                                        370/329
(Continued)

OTHER PUBLICATIONS

Ericsson, "Tdoc R2-164023: DRX in NR," 3rd Generation Partnership Project (3GPP), TSG-RAN WG2 #94, May 23-27, 2016, 5 pages, Nanjing, P.R. China.
(Continued)

*Primary Examiner* — Lee Nguyen
(74) *Attorney, Agent, or Firm* — Withrow & Terranova, PLLC

(57) ABSTRACT

Methods and apparatus are disclosed for operating a terminal device and a network node. A method of operating a terminal device of a wireless communications network, the terminal device being operable in one or more modes, the one or more modes including one or more discontinuous reception, DRX, modes, the method comprises: selecting a duration for an inactivity timer of the DRX mode; upon receiving or transmitting one or more wireless communications, starting the inactivity timer; and responsive to a determination that the duration for the inactivity timer has expired without the terminal device receiving or transmitting one or more further wireless communications, entering a DRX sleep state.

33 Claims, 6 Drawing Sheets

(52) U.S. Cl.
CPC ........ *Y02D 70/126* (2018.01); *Y02D 70/1226* (2018.01); *Y02D 70/1242* (2018.01); *Y02D 70/1262* (2018.01); *Y02D 70/1264* (2018.01); *Y02D 70/14* (2018.01); *Y02D 70/146* (2018.01); *Y02D 70/20* (2018.01); *Y02D 70/21* (2018.01); *Y02D 70/23* (2018.01); *Y02D 70/24* (2018.01)

(58) Field of Classification Search
USPC .......................................................... 455/574
See application file for complete search history.

(56) References Cited

U.S. PATENT DOCUMENTS

| | | | | |
|---|---|---|---|---|
| 2012/0207070 A1* | 8/2012 | Xu | ................... | H04W 52/0225 370/311 |
| 2014/0211676 A1* | 7/2014 | Chhabra | ............... | H04W 76/38 370/311 |
| 2014/0247765 A1 | 9/2014 | Baghel et al. | | |
| 2015/0271755 A1* | 9/2015 | Karri | ................. | H04W 52/0229 370/252 |
| 2016/0286603 A1* | 9/2016 | Vajapeyam | ......... | H04W 76/048 |
| 2017/0019852 A1* | 1/2017 | Yang | ................. | H04W 52/0216 |
| 2017/0142777 A1* | 5/2017 | Vuppala | ................. | H04W 76/27 |

OTHER PUBLICATIONS

International Search Report and Written Opinion for International Patent Application No. PCT/SE2017/050529, dated Aug. 21, 2017, 15 pages.

Author Unknown,"Technical Specification Group Radio Access Network; Evolved Universal Terrestrial Radio Access (E-UTRA); Medium Access Control (MAC) protocol specification (Release 12)," Technical Specification 36.321, Version 12.9.0, 3GPP Organizational Partners, Mar. 2016, 77 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.11.0, 3GPP Organizational Partners, Mar. 2015, 356 pages.

\* cited by examiner

METHODS AND APPARATUS FOR CONFIGURING A DISCONTINUOUS RECEPTION MODE IN A WIRELESS NETWORK

This application is a 35 U.S.C. § 371 national phase filing of International Application No. PCT/SE2017/050529, filed May 19, 2017, which claims the benefit of U.S. Provisional Application No. 62/340,851, filed May 24, 2016, the disclosures of which are incorporated herein by reference in their entireties.

TECHNICAL FIELD

Examples of the present disclosure relate to methods and apparatus in a wireless network, and particularly relate to methods and apparatus for configuring a discontinuous reception mode in a wireless network.

BACKGROUND

Long Term Evolution (LTE) includes a discontinuous reception (DRX) mode to conserve the battery of a terminal device. When DRX mode is configured in a terminal device, the terminal device is able to turn its receiver off and enter a low-power state, waking for defined (periodic) phases to listen for scheduling messages or other wireless communications. For example, when the terminal device is in a DRX sleep state, it does not need to listen on the physical downlink control channel (PDCCH). When the terminal device is in the DRX active state, it must normally listen on the PDCCH to wait for potential scheduling requests from the network (e.g. from the eNodeB).

According to the 3rd Generation Partnership Project (3GPP) media access control (MAC) standard for LTE (Technical Specification Group 36.321, version 12.9.0), the terminal device is in the DRX active state when any of the conditions specified in section 5.7 is true, that is to say:

1 DRX parameters are not configured; or
2 DRX parameters are configured and
  2.1 drx-Inactivity Timer is running; or
  2.2 drx-Retransmission Timer is running; or
  2.3 mac-ContentionResolutionTimer is running; or
  2.4 a Scheduling Request sent on the physical uplink control channel (PUCCH) is pending; or
  2.5 an uplink grant for a pending hybrid automatic repeat request (HARQ) retransmission can occur and there is data in the corresponding HARQ buffer; or
  2.6 a PDCCH indicating a new transmission addressed to the C-RNTI of the terminal device has not been received after successful reception of a Random Access Response for the explicitly signaled preamble (only applicable to terminal devices in RRC_CONNECTED).

If none of these conditions is true, then the terminal device is in the DRX sleep state (i.e. its receiver is turned off).

A terminal device in RRC_CONNECTED state and which has been configured with the DRX function can be configured with both a long DRX cycle and a short DRX cycle. The intention with the long DRX cycle is that the terminal device should be able to sleep for a long time and wake up only periodically to listen for any new scheduling requests. The intention with the short DRX cycle is that the terminal device should be awake more frequently than in the long DRX cycle to listen for any scheduling requests. Those time periods when the terminal device is awake to listen for scheduling requests are called OnDuration periods, and are configured for a certain time duration.

When the terminal device is scheduled, an inactivity timer called drx-InactivityTimer is started and while this timer is running the terminal device is awake to listen for any scheduling requests. When the drx-InactivityTimer expires, the terminal device will go to short DRX sleep, if configured, otherwise the terminal device will go to long DRX sleep.

If the terminal device has not been scheduled for a configured number of short DRX cycles the terminal device will go to long DRX sleep.

The problem with the existing solution for DRX is that, to ensure high throughput data transfer when sending/receiving large data volumes, it is important to use a rather long drx-InactivityTimer. This is needed for mainly two reasons: one is that due to transmission control protocol (TCP) flow control, there may not always be data in the buffer to send/receive, but new data can come at any time; and a second reason is that the load in the radio network node (e.g. the eNodeB) may vary significantly and the eNodeB may not always be able to schedule a terminal device for a number of subframes due to high load. However, when it can schedule the terminal device, it is important that the terminal device is in DRX active time to receive the scheduling messages.

However, using a large value for the drx-InactivityTimer (such as 200 ms) will in many cases cause the terminal device to be awake for much longer than necessary. For many short traffic flows there is no need for the terminal device to be kept awake for this long time.

For example, when voice over LTE (VoLTE) traffic is ongoing for the terminal device, in many cases it may be advantageous to configure a short drx-InactivityTimer to allow the terminal device some short sleep period between sending/receiving the speech frames. However, if a medium or large data packet needs to be transmitted or received during this speech call, lower throughput will be achieved for the data transfer because of the small value of the drx-InactivityTimer.

Reconfiguring the length of the drx-InactivityTimer when needed using the RRC protocol is not always optimal because it is difficult to know when reconfiguration should be done, and it is costly in signaling resources in the radio network node and in the radio interface. In the worst cases, a data burst may end shortly after a reconfiguration from a short to a long drx-InactivityTimer, or a large data burst may start shortly after a reconfiguration from a long to a short drx-InactivityTimer.

SUMMARY

In one aspect of the present disclosure, there is provided a method of operating a terminal device of a wireless communications network, the terminal device being operable in one or more modes, the one or more modes including one or more discontinuous reception, DRX, modes, the method comprising: selecting a duration for an inactivity timer of the DRX mode; upon receiving or transmitting one or more wireless communications, starting the inactivity timer; and responsive to a determination that the duration for the inactivity timer has expired without the terminal device receiving or transmitting one or more further wireless communications, entering a DRX sleep state.

In another aspect, there is provided a terminal device configured to carry out the method recited above.

In another aspect, there is provided a method of operating a network node of a wireless communications network, the wireless communications network further comprising a terminal device being operable in one or more modes, the one or more modes including one or more discontinuous reception, DRX, modes, the method comprising: selecting a duration for an inactivity timer for use by the terminal device in entering the DRX mode; and initiating transmission of a control signal to the terminal device, the control signal containing an indication of the selected duration.

In a further aspect, there is provided a network node configured to carry out the method recited above.

In another aspect, there is provided a terminal device, comprising processor circuitry and a computer-readable storage medium, the terminal device being operable in one or more modes, the one or more modes including one or more discontinuous reception, DRX, modes the computer-readable storage medium storing instructions that are executable by the processor circuitry whereby the terminal device is operative to: select a duration for an inactivity timer of the DRX mode; upon receiving or transmitting one or more wireless communications, start the inactivity timer; and responsive to a determination that the duration for the inactivity timer has expired without the terminal device receiving or transmitting one or more further wireless communications, enter a DRX sleep state.

The disclosure further provides a network node comprising processor circuitry and a computer-readable storage medium, the computer-readable storage medium storing instructions that are executable by the processor circuitry whereby the network node is operative to: select a duration for an inactivity timer for use by a terminal device in entering the DRX mode; and initiate transmission of a control signal to the terminal device, the control signal containing an indication of the selected duration In another aspect, there is provided a terminal device for a wireless communication network, the terminal device being operable in one or more modes, the one or more modes including one or more discontinuous reception, DRX, modes, the terminal device comprising: a first module configured to select a duration for an inactivity timer of the DRX mode; a second module configured to, upon receiving or transmitting one or more wireless communications, start the inactivity timer; and a third module configured to, responsive to a determination that the duration for the inactivity timer has expired without the terminal device receiving or transmitting one or more further wireless communications, control the terminal device to enter a DRX sleep state.

The disclosure also provides a network node for a wireless communication network, the wireless communication network further comprising a terminal device, the network node comprising: a first module configured to select a duration for an inactivity timer for use by the terminal device in entering the DRX mode; and a second module configured to initiate transmission of a control signal to the terminal device, the control signal containing an indication of the selected duration.

It should be noted that, although the methods and apparatus set forth are described largely in the context of LTE and networks that may be suitable for providing radio communications meeting one or more of the criteria established by the Next Generation Mobile Networks Alliance for the 5th generation of mobile telecommunications standards (5G), the concepts disclosed herein are in no way limited to LTE or 5G, and are applicable to any wireless communication system.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
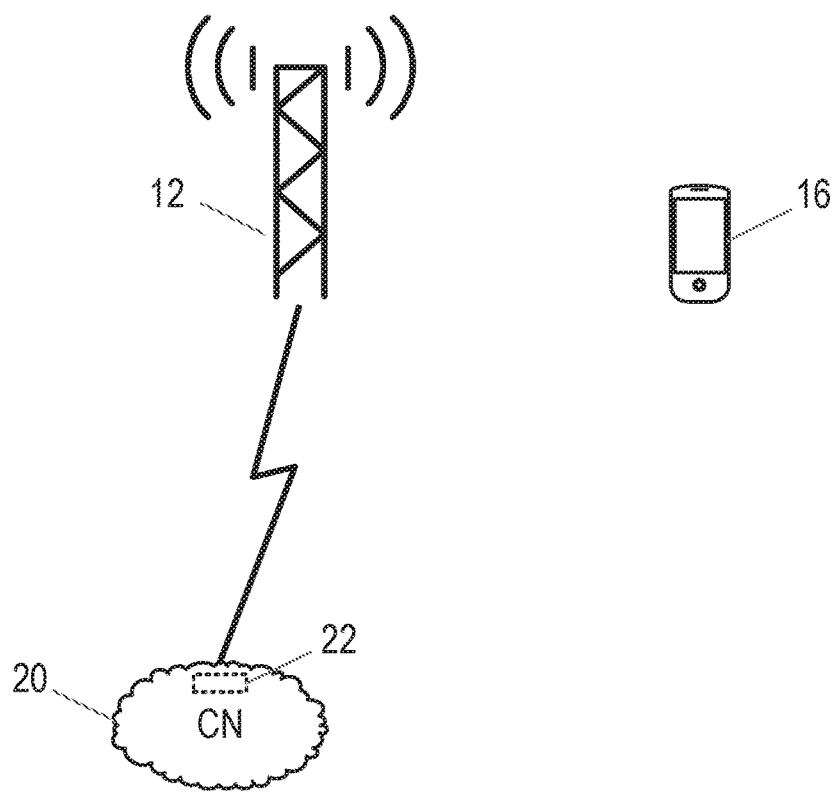
FIG. 1 is a schematic drawing of a wireless communication network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Although the terms "wireless device" or "terminal device" may be used in the description, it is noted that these terms encompass other terms used to denote wireless devices, such as user equipment (UE). It should be understood by the person skilled in the art that "UE" is a non-limiting term comprising any mobile or wireless device or node equipped with a radio interface allowing for at least one of: transmitting signals in uplink (UL), receiving and/or measuring signals in downlink (DL), and transmitting and/or receiving signals in a D2D/sidelink mode. A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "wireless device" or "UE", the terms "mobile device" and "terminal device" may be used interchangeably in the description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, Universal Mobile Telecommunications System (UMTS), Long-Term Evolution, LTE, etc.

It should be noted that use of the term "radio access node" as used herein can refer to a base station, such as an eNodeB, a network node in the RAN responsible for resource management, such as a radio network controller (RNC), or, in some cases, a core network node, such as a mobility management entity (MME), a ProSe function (ProSe-F) node or a ProSe Application Server. The term "network node" encompasses radio access nodes, and also nodes within or accessible via a core network. For example, a network node may comprise a server that is located remote from a radio access node, but receives data signals from the radio access node and provides control signals for the radio access node. This latter example reflects the increasing trend in telecommunications systems for functionality to be removed to servers operating in "the cloud".

A wireless communications network comprises radio access nodes providing radio coverage over at least one respective geographical area forming what may be known as a "cell". The cell definition may also incorporate frequency bands used for transmissions, which means that two different cells may cover the same geographical area but use different frequency bands. Future wireless networks may depart from or expand upon such conventional terminology. For example, a cell may comprise multiple directional beams that provide radio coverage to different parts of the cell. The radio access node serving such a cell may comprise a plurality of antennas such that one or more respective antennas are configured to provide each respective beam. Alternatively, the "cell" terminology may be abandoned altogether such that a radio access node provides only beams with no particular correspondence to a cell.

Terminal devices are served in the cells or beams by the respective radio access node and communicate with the respective radio access node. The terminal devices transmit data over an air or radio interface to the radio access nodes in uplink (UL) transmissions and the radio access nodes transmit data over an air or radio interface to the UEs in downlink (DL) transmissions.

FIG. 1 is a schematic drawing of a wireless communication network 10 in accordance with examples of the disclosure. Those skilled in the art will appreciate that numerous features and components of the network 10 are omitted from the drawing for clarity.

The wireless communication network 10 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 10 may be suitable for providing radio communications meeting one or more of the criteria established by the Next Generation Mobile Networks Alliance for the $5^{th}$ generation of mobile telecommunications standards.

The network 10 comprises a radio network node 12 that provides radio coverage for a cell. A single radio network node is shown in FIG. 1, but the network 10 will in general comprise a plurality of radio network nodes, with each node serving one or multiple cells over different coverage areas and/or frequencies.

The radio network node 12 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with a terminal device over a wireless interface, independent of e.g. the radio access technology and terminology used. In the rest of the disclosure, the term "radio network node" will be used for the radio network node 12, in order to facilitate the comprehension of the present methods.

The network 10 further comprises a terminal device 16 which is within the coverage area of the radio network node 12.

The terminal device 16 shown in FIG. 1 is a smartphone. However, the terminal device 16 may be any device that is suitable for wireless communication with the radio network node 12. For example, the terminal device may be a phone, smartphone, tablet, etc, or a machine-type communication (MTC) device such as a sensor, meter, etc. The terminal device may also be called a user equipment (UE).

The network 10 further comprises a core network (CN) 20 in communication with the radio network node 12, that provides various services such as the routing of packets, etc, as is known in the art.

In one embodiment, the CN 20 comprises, or provides access to, a server 22 that is located remote from the radio network node 12, but provides control signals for the radio network node 12 and receives data signals from the radio network node 12. For example, the server 22 may be located in the "cloud". In these embodiments, elements of the functionality of the radio network node 12, which is to be described below, may be distributed to one or more virtual machines running on the server 22 (or more than one server). Except where explicitly stated otherwise, references below to functions carried out by the radio network node 12 may also be carried out in the server 22 (or a plurality of similar servers) located remote from the radio network node 12.

Figure 2:
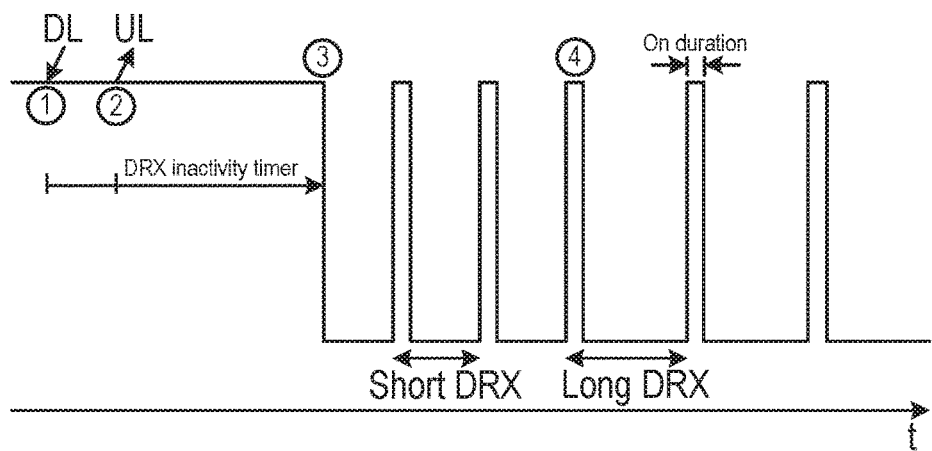
FIG. 2 is a graph showing example battery usage of a terminal device entering a DRX sleep state.

FIG. 2 is a graph showing example battery usage over time of a terminal device, such as the terminal device 16, entering a DRX sleep state.

At time 1, the terminal device is scheduled for and granted (for example, via the PDCCH) one or more DL transmissions from a radio network node (e.g. the radio network node 12 shown in FIG. 1). The terminal device receives the DL data and starts its inactivity timer. In the illustrated embodiment, the inactivity timer is called DRX inactivity timer (e.g. drx-InactivityTimer as defined in the LTE standard release 12). However, other nomenclature may be used without departing from the scope of the concepts described herein. Battery usage in the terminal device is relatively high owing to the need to continuously monitor and receive communications using the receiver of the device.

At time 2, before the inactivity timer expires, the terminal device receives an UL scheduling message (e.g. grant of a scheduling request, using PDCCH) and shortly thereafter transmits UL data to the radio network node. Upon the transmission of the UL data, the terminal device restarts the inactivity timer (i.e. reset to its initial value or a different initial value). While the inactivity timer is running, the terminal device is in an active state, continuously monitoring for signals (such as scheduling grants, etc) transmitted by the radio network node. Accordingly, battery usage remains relatively high throughout this period.

At time 3, the inactivity timer expires without further wireless communications being transmitted or received by the terminal device. The determination as to which further wireless communications cause the inactivity timer to be reset or restarted may be made by the designer of the system. In one example, any wireless communications transmitted or received by the terminal device cause the terminal device to reset or restart the inactivity timer. In another example, certain wireless communications may not cause the inactivity timer to be reset. For example, retransmissions of wireless communications (e.g. such as mandated by the HARQ protocol in the event of a failed transmission), whether transmitted or received by the terminal device, may not cause the inactivity timer to be reset.

Upon expiry of the inactivity timer, the terminal device enters a DRX sleep state and battery usage is lowered. For example, the DRX sleep state may involve the terminal device turning off, deactivating or otherwise suspending its receiver such that one or more channels with the radio network node (e.g. the PDCCH) are not monitored. One or more further steps to reduce battery consumption in the terminal device may also be taken.

The terminal device may operate in one or more DRX cycles, with each DRX cycle comprising a period of time in which the terminal device is in the sleep state as defined above, and a period of time in which the terminal device wakes to monitor one or more channels for wireless communications from the radio network node. For example, when the terminal device wakes, it may activate its receiver in order to monitor the PDCCH or other channels and listen for scheduling grants or other messages. The length of time that the terminal device wakes for is referred to (in release 12 of the LTE standard) as OnDuration.

More than one DRX cycle having different lengths may be defined. In the illustrated example, two DRX cycles are defined: a short DRX cycle; and a long DRX cycle. The sleep period of the long DRX cycle may be relatively longer than the sleep period of the short DRX cycle. The On Duration of the long DRX cycle may be the same as or different to the On Duration of the short DRX cycle.

Initially, at time 3, the terminal device enters the short DRX cycle. At time 4 (for example, after a configured number of short DRX cycles), the terminal device enters the long DRX cycle, and can thus sleep for a greater percentage of the time.

In other examples, the terminal device may enter the long DRX cycle directly upon expiry of the inactivity timer, or only a single DRX cycle may be defined. In further examples, more than two DRX cycles may be defined. The concepts disclosed herein are not limited to any particular DRX cycle or combination of DRX cycles.

As noted above, a problem associated with current wireless communication networks is that the duration of the inactivity timer (e.g. drx-InactivityTimer) upon which the terminal device determines whether to enter a DRX mode is configured by the network and remains static for a particular network connection. A relatively long inactivity timer may be suitable if the terminal device is transmitting or receiving large amounts of data (e.g. file transfer protocol (FTP) traffic), but this will not be suitable in all cases, resulting in unnecessary battery usage. Conversely, a relatively short inactivity timer may be suitable if the terminal device is transmitting small packets of data regularly (e.g. such as voice traffic), but this will have a negative impact on throughput if large data transfers are required.

Figure 3:
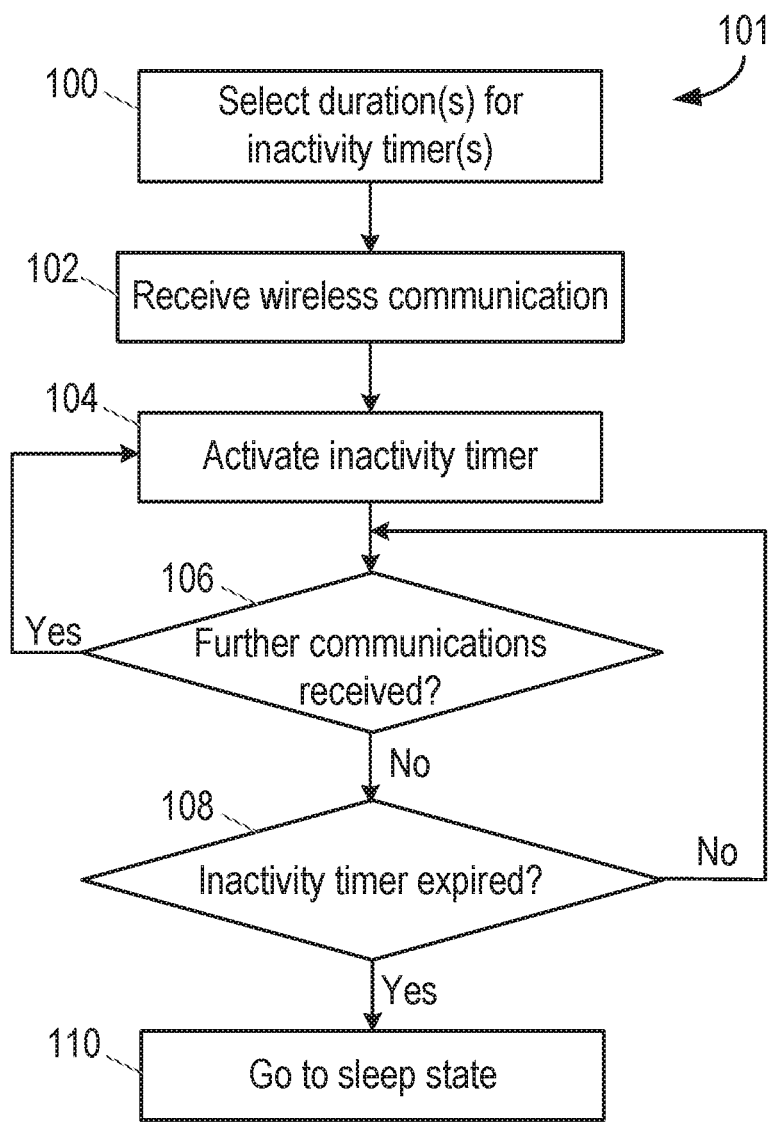
FIG. 3 is a flowchart of a method in accordance with examples of the disclosure.

FIG. 3 is a flowchart of a method 101 in accordance with examples of the disclosure. The method may be carried out in a terminal device, for example, such as the terminal device 16 described above with respect to FIG. 1.

In step 100, the terminal device selects a duration for its inactivity timer. The inactivity timer defines how long the terminal device is required to be awake after it has been active. For example, the inactivity timer may define how long the terminal device is required to monitor one or more channels (such as the PDCCH) after it has been active. In Release 12 of the LTE standard, this timer is termed drx-InactivityTimer; however, in other standards alternative nomenclature may be used.

A number of different mechanisms for selecting the duration value will be described in greater detail below. However, it should be appreciated that while in some examples the terminal device selects between only two inactivity timer durations, the concepts defined herein are not limited in that respect, and the terminal device may select between more than two duration values, or may calculate the duration without reference to predetermined values.

Further, while it will herein be described how the terminal device selects one duration for the inactivity timer, it will be appreciated that in some examples the terminal device may select more than one duration (i.e. a set of duration values) for the inactivity timer. For example, the set of duration values may contain different duration values to be used in different circumstances. In one example, the set of duration values may contain a duration value for the inactivity timer upon expiry of which the terminal device enters a first, short DRX cycle; and a duration value for the inactivity timer upon expiry of which the terminal device enters a second, long DRX cycle. Further, different types of DRX cycle may be defined, with a duration value selected for each.

In one embodiment the terminal device, in step 100, selects a timer duration for an inactivity timer based on an indication from the network, e.g. from a radio network node such as the radio network node 12. The indication may be contained in a media access layer (MAC) message, such as a MAC control element or other control message.

The indication may be an explicit indication of which timer duration the terminal device shall apply, i.e. the indication may be a field which indicates the timer duration which the terminal device shall apply. The field may indicate in a time unit (e.g. milliseconds, or transmit time intervals) how long the timer duration should be.

In an alternative example, the indication may comprise an index, with the terminal device having access to a mapping between indices and corresponding timer durations. E.g. Timer duration 1 is mapped to index X, timer duration 2 is mapped to index Y, etc.

The mapping may be preconfigured within the terminal device at the point of manufacture or software update, for example if the mapping is proscribed in a specification. This example has the benefit that the required signaling is relatively low since the mapping is already configured in the terminal device. However, flexibility to change duration values and mappings may be limited.

In another example, the mapping is configured for the terminal device by the network, e.g. from a radio network node. For example, the network may provide a set of timer durations {T1, T2, T3, . . . } and the timer durations may be associated with indices {I1, I2, I3, . . . }. This mapping may be configured using radio resource control (RRC) signaling. The radio network node may then indicate which timer duration the terminal device shall apply by indicating the associated index. This allows for more flexibility compared to the case when the mapping is proscribed in a specification.

The indication of which duration to use may be valid only for a certain period of time. For example, the radio network node may indicate at time T that the terminal device shall apply a certain timer duration but the terminal device shall only apply the indicated timer duration until a time T+X. After the time X, the terminal device may change timer duration to another timer duration. For example, the terminal device may start to apply a default timer duration after the time X, or it may start to apply the timer duration which it applied prior to receiving the indication from the network, i.e. reverting to the previous timer duration.

When the terminal device receives the indication from the network of which timer duration to apply, in step 100 it may immediately select and start to apply the indicated timer duration. Alternatively, the terminal device may start to apply the indicated timer duration at a certain point in time relative to the time at which the terminal device received the indication (i.e. after a finite delay). Examples of such points in time are provided below:

Upon decoding of the message containing the indication

A time T after decoding the message containing the indication

At the next time the terminal device starts the timer which applies the indicated timer duration At the next time the terminal device is active due to a periodic timer, e.g. next time the terminal device is awake due to a periodically started timer.

In some examples, the terminal device may apply a default timer duration in the absence of indications from the network. Which timer duration the terminal device considers to be the default timer duration may be indicated by the network (e.g. the radio network node) or defined in a specification. In the former case, such an indication may be an explicit indication such as a flag in an RRC message indicating which timer duration is the default timer duration, or it may be implicitly signaled by the radio network node, for example, by being the first timer duration in a list of timer durations. Another implicit approach is that the default timer duration is signaled in a separate field compared to other (additional) timer durations.

In an alternative example, the terminal device selects in step 100 a timer duration for its inactivity timer based on a characteristic of the wireless traffic which is (or has recently been) active.

For example, the characteristic of the wireless traffic may comprise the type of wireless traffic on which the terminal device is (or has recently been) active. As examples, the type of wireless traffic may comprise any of: file transfer protocol (FTP) traffic, transmission control protocol (TCP) traffic and voice traffic. However, the concepts described herein are applicable to different types of traffic.

The terminal device may select a first duration for the inactivity timer in the event that the wireless traffic is of a first type; and a second, different duration for the inactivity timer in the event that the wireless traffic is of a second type. For example, if the terminal device is active or has recently been active in transmitting or receiving TCP or FTP traffic, the terminal device may select a relatively long duration for the inactivity timer; if the terminal device is active or has recently been active in transmitting or receiving voice traffic, the terminal device may select a relatively short duration for the inactivity timer.

The traffic type may be determined by determining the bearer upon which the traffic was transmitted or received. For example, the terminal device may have a plurality of different radio bearers configured with the radio network node, with each bearer for a particular type of wireless traffic.

In other examples, the characteristic of the wireless traffic may be differentiated based on which bearer, flow, public data network (PDN) connection, quality of service (QoS) class, etc it belongs to. This means that the terminal device may select a first timer-duration T1 for a first bearer/flow/PDN-connection/QoS class, and a second timer-duration T2 for a second first bearer/flow/PDN-connection/QoS class. This allows the terminal device to apply a first timer duration if voice traffic has been active (for example) while applying another timer-duration if FTP traffic has been active (for example).

For example, the terminal device may be preconfigured (for example based on a specification) as to what timer duration the terminal device should apply for different characteristics of the traffic. For example the specification may specify what the timer duration should be for wireless traffic based on its QoS characteristics, which may translate to which QoS class the traffic belongs to.

If certain traffic characteristics (e.g. a particular type of traffic or a particular QoS, etc) have no specific timer duration associated with them, the terminal device may apply a default timer duration for that traffic, i.e. substantially as noted above with respect to the absence of an indication from the network. The default timer duration may be configured by the radio network node or specified in a specification, for example.

In a further example, the terminal device may be configured to select a duration for the inactivity timer based on the frequency with which wireless traffic is received or transmitted (or expected to be received/transmitted). For example, in step 100 the terminal device may select between two different duration values, TInactivity1 and TInactivity2, where TInactivity1 is used for relatively infrequent data/signaling transfer and TInactivity2 is used for relatively frequent data/signaling transfer over the radio interface. When the terminal device selects the TInactivity1 value it may be said to be in an infrequent scheduling state, and when the terminal device selects the TInactivity2 value it may be said to be in a frequent scheduling state. The terminal device may be in either the frequent scheduling state or the infrequent scheduling state upon DRX being configured for the terminal device.

In one example, the terminal device may change from the infrequent scheduling state to the frequent scheduling state if the terminal device is scheduled for data more frequently than one or more thresholds. For example, if any of the following conditions are true, either separately or in combination:

1. The terminal device is scheduled for new data N1 times within a time period T1.

The time period T1 may be a moving window, i.e. a time period of T1 in the past counted back from the current time (i.e. the current subframe).

2. The terminal device is scheduled for new data N2 times within any awake (e.g. "OnDuration") period within a time period T2. T2 may be, for example, a moving window similar to T1, or a time period since the start of the current awake period.

3. The terminal device is scheduled on a logical channel which has been configured to change the state of the terminal device to frequent scheduling state.

4. The terminal device is scheduled for UL transmissions and includes a buffer status report (BSR) that indicates more than 0 bytes of data.

In another example the terminal device may change from the frequent scheduling state to the infrequent scheduling state if the terminal device is scheduled for data more frequently than one or more thresholds. For example, if any of the following conditions are true, either separately or in combination:

1. The terminal device is not scheduled for new data within a time period T3.

2. The terminal device enters an awake period for a DRX cycle (e.g. a long DRX cycle) and it has been scheduled at most N3 times since the last time the terminal device entered an awake period for a long DRX cycle.

3. The inactivity time (based on time period TInactivity2) expires.

In one embodiment more than two scheduling states may be used for different levels of frequency of data/signaling transmission or reception. In this way there can be more a greater number of duration values for the inactivity timer based on a finer resolution of activity, where TInactivity1 is used for the most infrequent scheduling state and TInactivityN is used for the most frequent scheduling state. The transitions between these scheduling states can be triggered based on the same rules as indicated for the transition between TInactivity1 and TInactivity1, but can use different settings for the parameters.

In one example the state changes between frequent scheduling state and infrequent scheduling state take place immediately when triggered, and the length of the inactivity timer is not impacted until the next time the timer is started within the new scheduling state. If the inactivity timer is started in the same subframe as the state change, the new timer duration value of the timer may apply immediately to that timer.

If there are multiple duration values that may be selected according to, for example, different types (or other characteristics) of wireless traffic, a problem may arise if the inactivity timer is running at the point a new wireless communication is sent or received, and the new value is less than the remaining value of the timer when the new communication was sent or received. In one example, therefore, if the remaining time of the inactivity timer is larger than the timer duration which the terminal device shall apply based on the newly received or transmitted wireless communication, the terminal device may keep the remaining time of the timer since it is larger, i.e. without restarting the timer.

Consider for example that the terminal device has two types of traffic A and B and their associated timer durations TA which is 200 milliseconds and TB which is 4 milliseconds. At time T1 traffic A is active making the terminal device start the timer with the duration 200 milliseconds. 100 milliseconds later traffic B becomes active which calls for applying a timer-duration of 4 milliseconds. If the terminal device would at that point in time apply a 4 millisecond timer the terminal device may fall asleep quicker than it would, compared to if traffic B was never active, which may cause problems for the throughput of traffic A. By ignoring values that are less than the remaining value of a currently running timer, the terminal device may ensure that QoS requirements are fulfilled for all traffic handled by the terminal device.

In a further example, in case more than one traffic is active at the same time (e.g. in the same TTI) the terminal device may select the timer duration to apply based on the timer durations associated with the active traffics. For example, if both a first traffic and a second traffic are active at time, and the traffics are associated with timer duration T1 and T2 respectively, the terminal device may apply a timer duration considering both T1 and T2. For example the terminal device may apply a timer duration which is:

The maximum of T1 and T2
The minimum of T1 and T2
The mean of T1 and T2

This ensures that if the terminal device has several types of traffic active the terminal device will apply a timer duration which considers all types of traffic. E.g. if the first active traffic requires the terminal device to apply a time T1 and the second traffic a time T2, the terminal device may apply the largest of the two values ensuring that the terminal device is awake at least as long as is required for both traffics. Alternatively, selecting the minimum of T1 and T2 will ensure lower power consumption in the terminal device (as the terminal device will move to a sleep state more quickly).

In a further example, the terminal device may select a duration for the inactivity timer based on its access to a power source. For example, the terminal device may select a relatively long duration for the inactivity timer if the terminal device has access to an external power supply (i.e. if it is plugged to an electrical outlet) or if its battery capacity is above a threshold. In that case, the terminal device may have no need to conserve energy. Conversely, the terminal device may select a relatively short duration for the inactivity timer if the terminal device does not have access to an external power supply, or if its battery level is below a threshold. In that case, the terminal device may need to converse its power resources and so enter the DRX sleep state relatively quickly.

Thus, in step 100, the terminal device selects one or more durations for its inactivity timer.

In step 102, the terminal device receives a wireless communication signal from a radio network node (e.g. the radio network node 12), or transmits a wireless communication signal to the radio network node. The wireless communication may comprise, for example, a scheduling message, such as a scheduling grant, or some data.

In step 104, upon receiving or transmitting the wireless communication signal, the terminal device activates (that is, starts) its inactivity timer. The inactivity timer may be initialized to the duration selected in step 100, and configured to count down towards zero. In alternative examples, the inactivity timer may be initialized to zero and configured to count up towards the duration selected in step 100.

In some of the examples described above, it was disclosed how the terminal device may select a duration for the inactivity timer based on a characteristic of the wireless traffic on which the terminal device is active. The terminal device may therefore select a duration for the inactivity timer based on a characteristic of the wireless communication signal received or transmitted in step 102. In such examples, therefore, step 100 may take place after step 100.

Thus, for example, the terminal device may determine the characteristic of the wireless communication sent or received in step 102 (whether the type of traffic, quality of service, radio bearer over which the traffic was sent/received, or any of the possibilities identified above) and determine the associated timer duration for that traffic.

Even though it may take some time for the receiving side (either the terminal device or the radio network node) to decode the message and determine which type of data was received, the setting of the new timer value can be done logically at the point in time when the data/signal message was received. Hence, the terminal device or the radio network node may adjust the inactivity timer to its new value at some time after the reception of the message, taking into account the time period that has already past. Alternatively it is also possible for the receiving side to adjust to the new timer value a certain fixed time offset after the reception of the message took place.

In some examples, it may also be assumed that the new timer duration value should only apply when the receiving side has received the message correctly, decoded the message, and sent an acknowledgement back to the sender of the message; and in this case the point in time when the new timer duration value should be valid can be at the time when the message was received, at the point in time when the message was successfully acknowledged, or at some other point in time that is a fixed offset of any of these times.

In step 106, while the inactivity timer is running, the terminal device determines whether it has received any further wireless communications (e.g. from the radio network node), or transmitted any further wireless communications. If the terminal device receives or transmits any further wireless communications while the inactivity timer is running, the method may return to step 104 in which the inactivity timer is restarted or reset. In some examples, however, as noted above, if a duration mandated by the new wireless communication is shorter than the remaining time on the inactivity timer, the timer may not be restarted, i.e. the remaining time on the timer is left.

Certain wireless communications received or transmitted by the terminal device while the inactivity timer is running may not trigger a return to step 104. For example, retransmissions of wireless communications (such as mandated by the HARQ protocol) may not trigger the inactivity timer to be restarted.

If no further communications are sent or received, the method proceeds to step 108 in which the terminal device determines whether the inactivity timer has expired (i.e. the timer has reached zero, if it is configured to count down, or the selected duration if configured to count up). If the timer has expired, the terminal device is controlled to move into the sleep state in step 110. As noted above, this means that the terminal device may turn off its receiver, or otherwise stop monitoring one or more radio channels for a period of time. The sleep state may be part of a long DRX cycle, for example, or a short DRX cycle.

If the timer has not expired, the process reverts to step 106 in which the terminal device continues to monitor channels in communication with the radio network node until a wireless communication is transmitted or received, or the inactivity timer expires (whichever is sooner).

Figure 4:
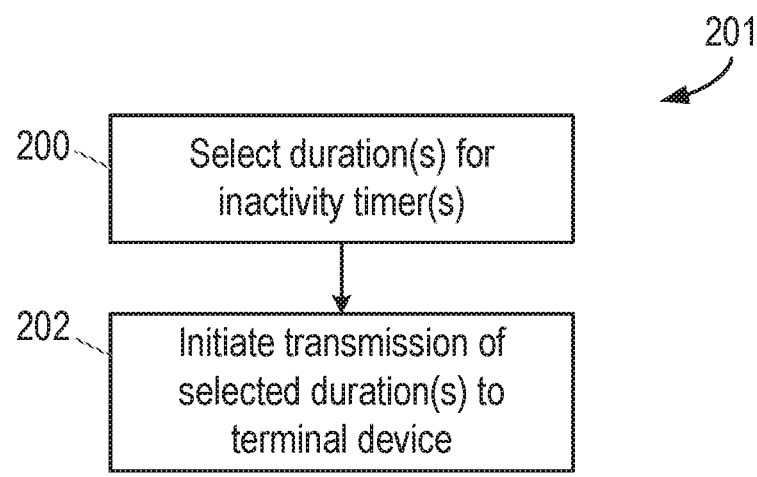
FIG. 4 is a flowchart of another method in accordance with examples of the disclosure.

FIG. 4 is a flowchart of another method 201 in accordance with examples of the disclosure. The method 201 may be carried out, for example, by a network node. The network node may, for example, the radio network node 12 or the server 22.

In step 200, the network node selects one or more durations for an inactivity timer of a terminal device with which the network node is in communication.

The inactivity timer defines how long the terminal device is required to be awake after it has been active. For example, the inactivity timer may define how long the terminal device is required to monitor one or more channels (such as the PDCCH) after it has been active. In Release 12 of the LTE standard, this timer is termed drx-InactivityTimer; however, in other standards alternative nomenclature may be used.

In an example, the network node selects in step 200 a timer duration for the inactivity timer based on a characteristic of the wireless traffic on which the terminal device is (or has recently been) active.

For example, the characteristic of the wireless traffic may comprise the type of wireless traffic on which the terminal device is (or has recently been) active. As examples, the type of wireless traffic may comprise any of: file transfer protocol (FTP) traffic, transmission control protocol (TCP) traffic and voice traffic. However, the concepts described herein are applicable to any and all different types of traffic.

The network node may select a first duration for the inactivity timer in the event that the wireless traffic is of a first type; and a second, different duration for the inactivity timer in the event that the wireless traffic is of a second type. For example, if the terminal device is active or has recently been active in transmitting or receiving TCP or FTP traffic, the network node may select a relatively long duration for the inactivity timer; if the terminal device is active or has recently been active in transmitting or receiving voice traffic, the network node may select a relatively short duration for the inactivity timer.

The traffic type may be determined by determining the bearer upon which the traffic was transmitted or received. For example, the terminal device may have a plurality of different radio bearers configured with the radio network node, with each bearer for a particular type of wireless traffic.

In other examples, the characteristic of the wireless traffic may be differentiated based on which bearer, flow, public data network (PDN) connection, quality of service (QoS) class, etc it belongs to. This means that the network node may select a first timer-duration T1 for a first bearer/flow/PDN-connection/QoS class, and a second timer-duration T2 for a second first bearer/flow/PDN-connection/QoS class. This allows the terminal device to apply a first timer duration if voice traffic has been active (for example) while applying another timer-duration if FTP traffic has been active (for example).

In a further example, the network node may be configured to select a duration for the inactivity timer based on the frequency with which wireless traffic is received or transmitted (or expected to be received/transmitted). For example, in step 100 the network node may select between two different duration values, TInactivity1 and TInactivity2, where TInactivity1 is used for relatively infrequent data/signaling transfer and TInactivity2 is used for relatively frequent data/signaling transfer over the radio interface. When the network node selects the TInactivity1 value the terminal device may be said to be in an infrequent scheduling state, and when the network node selects the TInactivity2 value the terminal device may be said to be in a frequent scheduling state. The terminal device may be in either the frequent scheduling state or the infrequent scheduling state upon DRX being configured for the terminal device.

In one example, the terminal device may change from the infrequent scheduling state to the frequent scheduling state if the terminal device is scheduled for data more frequently than one or more thresholds. For example, if any of the following conditions are true, either separately or in combination:

1. The terminal device is scheduled for new data N1 times within a time period T1. The time period T1 may be a moving window, i.e. a time period of T1 in the past counted back from the current time (i.e. the current subframe).

2. The terminal device is scheduled for new data N2 times within any awake (e.g. "OnDuration") period within a time period T2. T2 may be, for example, a moving window similar to T1, or a time period since the start of the current awake period.

3. The terminal device is scheduled on a logical channel which has been configured to change the state of the terminal device to frequent scheduling state.

4. The terminal device is scheduled for UL transmissions and includes a buffer status report (BSR) that indicates more than 0 bytes of data.

In another example the terminal device may change from the frequent scheduling state to the infrequent scheduling state if the terminal device is scheduled for data more frequently than one or more thresholds. For example, if any of the following conditions are true, either separately or in combination:

1. The terminal device is not scheduled for new data within a time period T3.

2. The terminal device enters an awake period for a DRX cycle (e.g. a long DRX cycle) and it has been scheduled at most N3 times since the last time the terminal device entered an awake period for a long DRX cycle.

3. The inactivity time (based on time period TInactivity2) expires.

In one embodiment more than two scheduling states may be used for different levels of frequency of data/signaling transmission or reception. In this way there can be a greater number of duration values for the inactivity timer based on a finer resolution of activity, where TInactivity1 is used for the most infrequent scheduling state and TInactivityN is used for the most frequent scheduling state. The transitions between these scheduling states can be triggered based on the same rules as indicated for the transition between TInactivity1 and TInactivity1, but can use different settings for the parameters.

In one example the state changes between frequent scheduling state and infrequent scheduling state take place immediately when triggered, and the length of the inactivity timer is not impacted until the next time the timer is started within the new scheduling state. If the inactivity timer is started in the same subframe as the state change, the new timer duration value of the timer may apply immediately to that timer.

In a further example, in case more than one traffic is active at the same time (e.g. in the same TTI) the network node may select the timer duration to apply based on the timer durations associated with the active traffics. For example, if both a first traffic and a second traffic are active at time, and the traffics are associated with timer duration T1 and T2 respectively, the network node may apply a timer duration considering both T1 and T2. For example the network node may apply a timer duration which is:

The maximum of T1 and T2
The minimum of T1 and T2
The mean of T1 and T2

This ensures that if the terminal device has several types of traffic active the terminal device will apply a timer duration which considers all types of traffic. E.g. if the first active traffic requires the terminal device to apply a time T1 and the second traffic a time T2, the terminal device may apply the largest of the two values ensuring that the terminal device is awake at least as long as is required for both traffics. Alternatively, selecting the minimum of T1 and T2 will ensure lower power consumption in the terminal device (as the terminal device will move to a sleep state more quickly).

In a further example, the radio network node may configure for the terminal device different timer durations for different traffic. For example, the radio network node may set the timer durations based on characteristics of the traffic such as what is the delay budget for the traffic.

In step 202, the network node initiates transmission of the selected duration (or durations) to the terminal device. For example, the server 22 may send a suitable control message to the serving radio network node 12, or the radio network node 12 itself may initiate the transmission.

In one example the network node may indicate the selected duration in a media access layer (MAC) message, such as a MAC control element or other control message.

The indication may be an explicit indication of which timer duration the terminal device shall apply, i.e. the indication may be a field which indicates the timer duration which the terminal device shall apply. The field may indicate in a time unit (e.g. milliseconds, or transmit time intervals) how long the timer duration should be.

In an alternative example, the indication may comprise an index, with the terminal device having access to a mapping between indices and corresponding timer durations. E.g. Timer duration 1 is mapped to index X, timer duration 2 is mapped to index Y, etc.

The mapping may be preconfigured within the terminal device at the point of manufacture or software update, for example if the mapping is proscribed in a specification. This example has the benefit that the required signaling is relatively low since the mapping is already configured in the terminal device. However, flexibility to change duration values and mappings may be limited.

In another example, the mapping is configured for the terminal device by the network, e.g. from the radio network node.

Thus FIGS. 3 and 4 provide methods 101, 201 in which the duration of a timer, used to determine how long a terminal device should remain awake after transmitting or receiving a wireless communication, is selected according to one of a number of different parameters, so as to adapt the timer duration appropriately for the circumstances of the terminal device.

Figure 5:
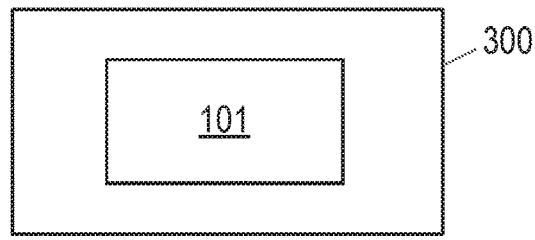
FIG. 5 is a schematic drawing of a terminal device in accordance with examples of the disclosure.

FIG. 5 is a schematic drawing of a terminal device 300 in accordance with examples of the disclosure. The terminal device 300 may be the terminal device 16 described above, for example.

The terminal device 300 is configured to carry out the method 101 described above with respect to FIG. 3. In particular, the terminal device may be configured to: select a duration for an inactivity timer of a DRX mode; upon receiving or transmitting one or more wireless communications, start the inactivity timer; and responsive to a determination that the duration for the inactivity timer has expired without the terminal device receiving or transmitting one or more further wireless communications, enter a DRX sleep state.

Figure 6:
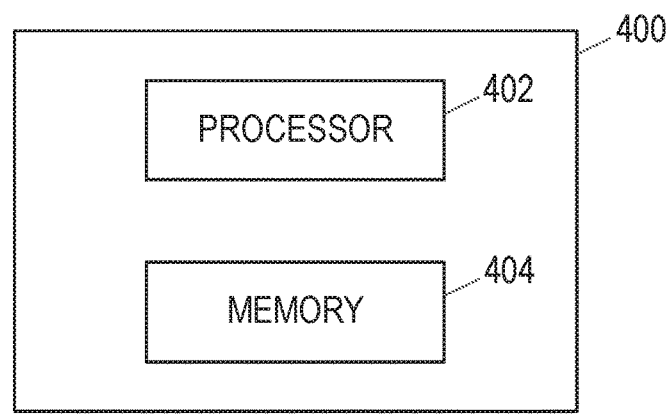
FIG. 6 is a schematic drawing of another terminal device in accordance with examples of the disclosure.

FIG. 6 is a schematic drawing of another terminal device 400 in accordance with examples of the disclosure. The terminal device 400 may be the terminal device 16 described above, for example.

The terminal device 400 comprises a processor 402 and a memory 404. The memory 404 contains instructions executable by the processor 402. The terminal device 400 is operative to: select a duration for an inactivity timer of a DRX mode; upon receiving or transmitting one or more wireless communications, start the inactivity timer; and responsive to a determination that the duration for the inactivity timer has expired without the terminal device receiving or transmitting one or more further wireless communications, enter a DRX sleep state.

The terminal device 400 may additionally comprise suitable hardware for transmitting and receiving wireless communication signals, such as one or more antennas, coupled to transceiver circuitry.

Figure 7:
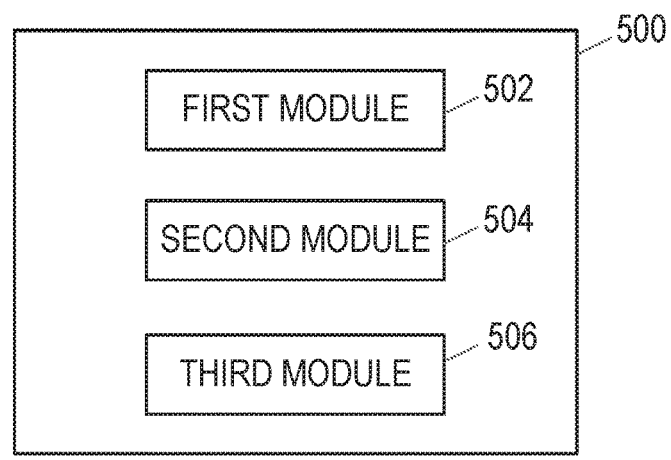
FIG. 7 is a schematic drawing of a further terminal device in accordance with examples of the disclosure.

FIG. 7 is a schematic drawing of a further terminal device 500 in accordance with examples of the disclosure. The terminal device 500 may be the terminal device 16 described above, for example.

The terminal device 500 comprises a first module 502, configured to select a duration for an inactivity timer of a DRX mode; a second module 504 configured to, upon receiving or transmitting one or more wireless communications, start the inactivity timer; and a third module 506 configured to, responsive to a determination that the duration for the inactivity timer has expired without the terminal device receiving or transmitting one or more further wireless communications, control the terminal device 500 to enter a DRX sleep state.

Figure 8:
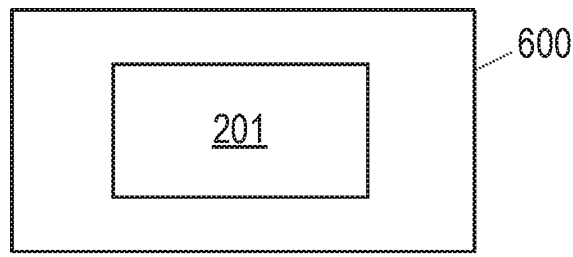
FIG. 8 is a schematic drawing of a network node in accordance with examples of the disclosure.

FIG. 8 is a schematic drawing of a network node 600 in accordance with examples of the disclosure. The network node 600 may be a radio network node, such as the radio network node 12, or a server such as the server 22.

The network node 600 is configured to carry out the method 201 described above with respect to FIG. 4. In particular, the network node may be configured to: select a duration for an inactivity timer for use by a terminal device for entering a DRX mode; and initiate transmission of a control signal to the terminal device, the control signal containing an indication of the selected duration.

Figure 9:
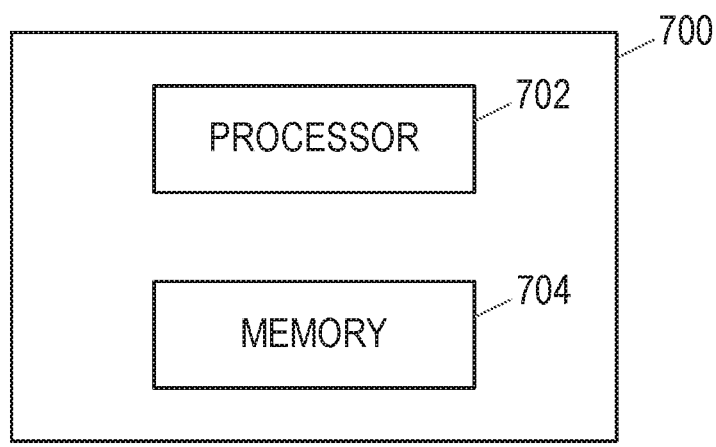
FIG. 9 is a schematic drawing of another network node in accordance with examples of the disclosure.

FIG. 9 is a schematic drawing of another network node 700 in accordance with examples of the disclosure. The network node 700 may be a radio network node, such as the radio network node 12, or a server such as the server 22.

The network node 700 comprises a processor 702 and a memory 704. The memory 704 contains instructions executable by the processor 702. The network node 700 is operative to: select a duration for an inactivity timer for use by a terminal device for entering a DRX mode; and initiate transmission of a control signal to the terminal device, the control signal containing an indication of the selected duration.

In examples where the network node 600 is a radio network node, such as the radio network node 12, the network node 600 may additionally comprise suitable hardware for transmitting and receiving wireless communication signals, such as one or more antennas, coupled to transceiver circuitry.

Figure 10:
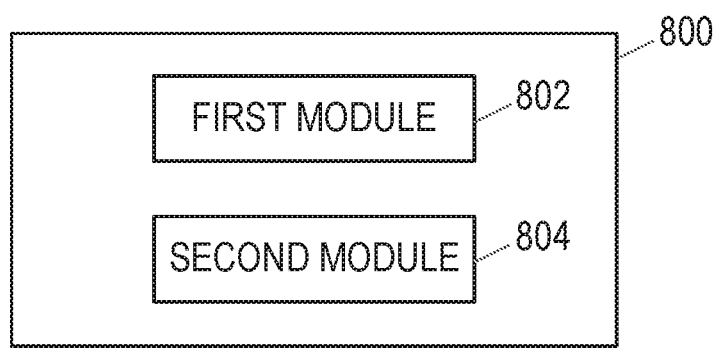
FIG. 10 is a schematic drawing of a further network node in accordance with examples of the disclosure.

FIG. 10 is a schematic drawing of a further network node 800 in accordance with examples of the disclosure. The network node 800 may be a radio network node, such as the radio network node 12, or a server such as the server 22.

The network node 800 comprises a first module 802 configured to select a duration for an inactivity timer for use by a terminal device for entering a DRX mode; and a second module 804 configured to initiate transmission of a control signal to the terminal device, the control signal containing an indication of the selected duration.

The present disclosure thus provides apparatus and methods in which the duration of a timer, used to determine how long a terminal device should remain awake after transmitting or receiving a wireless communication, is selected according to one of a number of different parameters, so as to adapt the timer duration appropriately for the circumstances of the terminal device.

It should be noted that the above-mentioned examples illustrate rather than limit the invention, and that those skilled in the art will be able to design many alternative examples without departing from the scope of the appended statements. The word "comprising" does not exclude the presence of elements or steps, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

Various examples of the present disclosure are set out in the following paragraphs:

1. A method of operating a terminal device of a wireless communications network, the terminal device being operable in one or more modes, the one or more modes including one or more discontinuous reception, DRX, modes, the method comprising:
    selecting a duration for an inactivity timer of the DRX mode;
    upon receiving or transmitting one or more wireless communications, starting the inactivity timer; and
    responsive to a determination that the duration for the inactivity timer has expired without the terminal device receiving or transmitting one or more further wireless communications, entering a DRX sleep state.

2. The method according to paragraph 1, wherein the step of selecting the duration for the inactivity timer comprises selecting the duration from a plurality of different durations.

3. The method according to paragraph 2, wherein the plurality of different durations are defined in RRC signaling from a network node of the wireless communications network to the terminal device.

4. The method according to any one of the preceding paragraphs, wherein the step of selecting the duration for the inactivity timer comprises selecting the duration based on an indication in a wireless control signal received from a network node of the wireless communications network.

5. The method according to paragraph 4, wherein the wireless control signal comprises a MAC signal.

6. The method according to paragraph 4 or 5, wherein the indication comprises a value for the duration.

7. The method according to paragraph 4 or 5, wherein the indication comprises an index which is mappable by the terminal device to a value for the duration.

8. The method according to paragraph 7, wherein the terminal device is preconfigured with a mapping between a plurality of indices and corresponding duration values.

9. The method according to paragraph 7, wherein a mapping between a plurality of indices and corresponding duration values is received by the terminal device in one or more wireless communications from a network node of the wireless communications network.

10. The method according to paragraph 9, wherein the one or more wireless communications from the network node comprise RRC signals.

11. The method according to any one of paragraphs 4 to 10, wherein the terminal device is configured to apply the duration for the inactivity timer based on the indication for a limited period of time.

12. The method according to any one of paragraphs 1 to 3, wherein the step of selecting the duration for the inactivity timer comprises selecting the duration based on a characteristic of wireless traffic received or transmitted by the terminal device.

13. The method according to paragraph 12, wherein the step of selecting the duration based on a characteristic of wireless traffic received or transmitted by the terminal device comprises selecting the duration based on a characteristic of wireless traffic on which the terminal device is currently active.

14. The method according to paragraph 13, wherein the step of selecting the duration based on a characteristic of wireless traffic received or transmitted by the terminal device comprises:
   determining a characteristic of the one or more wireless communications upon which the inactivity timer is started; and
   selecting the duration based on the determined characteristic.

15. The method according to any one of paragraphs 12 to 14, wherein the characteristic of wireless traffic comprises a type of wireless traffic.

16. The method according to paragraph 15, wherein the step of selecting the duration for the inactivity timer comprises selecting a first duration value for a first type of wireless traffic; and a second, different duration value for a second type of wireless traffic.

17. The method according to paragraph 15 or 16, wherein the type of wireless traffic is determined based on the radio bearer over which the wireless traffic is received or transmitted.

18. The method according to any one of paragraphs 15 to 17, wherein the type of wireless traffic comprises one or more of: file transfer protocol, FTP, traffic; and voice traffic.

19. The method according to paragraph 18, wherein the step of selecting the duration based on a characteristic of wireless traffic comprises selecting the first duration value when the terminal device has received or transmitted FTP traffic, and the second duration value when the terminal device has received or transmitted voice traffic, wherein the second duration value is smaller than the first duration value.

20. The method according to any one of paragraphs 12 to 19, wherein the characteristic of wireless traffic comprises one or more of: a quality of service for the wireless traffic; a type of radio bearer over which the wireless traffic is transmitted or received; an amount of data ready for uplink, UL, transmission by the terminal device; a logical channel of the wireless traffic.

21. The method according to any one of paragraphs 12 to 20, wherein the characteristic of wireless traffic received or transmitted by the terminal device comprises how frequently the wireless traffic is received or transmitted by the terminal device.

22. The method according to paragraph 21, wherein how frequently wireless traffic is received or transmitted by the terminal device comprises one or more of:
   a number of times the terminal device was scheduled to receive wireless traffic within a time period; and
   a number of times the terminal device was scheduled to receive wireless traffic within a time period during a current on duration period of the DRX mode.

23. The method according to any one of paragraphs 12 to 22, wherein the step of selecting the duration based on a characteristic of wireless traffic received or transmitted by the terminal device comprises selecting a first duration for the inactivity timer for wireless traffic received or transmitted by the terminal device in accordance with a first characteristic, and selecting a second duration for the inactivity timer for wireless traffic received or transmitted by the terminal device in accordance with a second characteristic, wherein the inactivity timer is started upon receiving or transmitting one or more wireless communications in accordance with the first characteristic, the method further comprising:
   while the inactivity timer is running, receiving or transmitting one or more wireless communications in accordance with the second characteristic;
   determining a remaining duration of the inactivity timer; and
   responsive to a determination that the remaining duration is greater than the second duration, allowing the inactivity timer to continue without resetting or restarting it.

24. The method according to any one of paragraphs 12 to 23, wherein the step of selecting the duration based on a characteristic of wireless traffic received or transmitted by the terminal device comprises selecting a first duration for the inactivity timer for wireless traffic received or transmitted by the terminal device in accordance with a first characteristic, and selecting a second duration for the inactivity timer for wireless traffic received or transmitted by the terminal device in accordance with a second characteristic.

25. The method according to paragraph 24, wherein the step of selecting the duration based on a characteristic of wireless traffic comprises selecting a duration that is one of:
   a maximum of the first and second durations;
   a minimum of the first and second durations; and
   a mean average of the first and second durations.

26. The method according to any one of the preceding paragraphs, where the one or more further wireless communications do not include retransmissions of wireless communications.

27. A method of operating a network node of a wireless communications network, the wireless communications network further comprising a terminal device being operable in one or more modes, the one or more modes including one or more discontinuous reception, DRX, modes, the method comprising:
   selecting a duration for an inactivity timer for use by the terminal device in entering the DRX mode; and
   initiating transmission of a control signal to the terminal device, the control signal containing an indication of the selected duration.

28. The method according to paragraph 27, wherein the step of selecting the duration for the inactivity timer comprises selecting the duration from a plurality of different durations.

29. The method according to paragraph 28, wherein the plurality of different durations are defined in the RRC context for the terminal device.

30. The method according to any one of paragraphs 27 to 29, wherein the control signal comprises a MAC signal.

31. The method according to any one of paragraphs 27 to 30, wherein the indication comprises a value for the duration.

32. The method according to any one of paragraphs 27 to 31, wherein the indication comprises an index which is mappable by the terminal device to a value for the duration.

33. The method according to paragraph 32, further comprising:
initiating transmission to the terminal device of a wireless signal comprising a mapping between a plurality of indices and corresponding duration values.

34. The method according to any one of paragraphs 27 to 33, wherein the step of selecting the duration for the inactivity timer comprises selecting the duration based on a characteristic of wireless traffic received from or transmitted to the terminal device.

35. The method according to paragraph 34, wherein the step of selecting the duration based on a characteristic of wireless traffic received from or transmitted to the terminal device comprises selecting the duration based on a characteristic of wireless traffic on which the terminal device is currently active.

36. The method according to paragraph 34 or 35, wherein the characteristic of wireless traffic comprises a type of wireless traffic.

37. The method according to paragraph 36, wherein the step of selecting the duration for the inactivity timer comprises selecting a first duration value for a first type of wireless traffic; and a second, different duration value for a second type of wireless traffic.

38. The method according to paragraph 36 or 37, wherein the type of wireless traffic is determined based on the radio bearer over which the wireless traffic is received or transmitted.

39. The method according to any one of paragraphs 36 to 38, wherein the type of wireless traffic comprises one or more of: file transfer protocol, FTP, traffic; and voice traffic.

40. The method according to paragraph 39, wherein the step of selecting the duration based on a characteristic of wireless traffic comprises selecting the first duration value when FTP traffic is received from or transmitted to the terminal device, and the second duration value when voice traffic is received from or transmitted to the terminal device, wherein the second duration value is smaller than the first duration value.

41. The method according to any one of paragraphs 34 to 40, wherein the characteristic of wireless traffic comprises one or more of: a quality of service for the wireless traffic; a type of radio bearer over which the wireless traffic is transmitted or received; an amount of data ready for uplink, UL, transmission by the terminal device.

42. The method according to any one of paragraphs 34 to 41, wherein the characteristic of wireless traffic received from or transmitted to the terminal device comprises how frequently the wireless traffic is received from or transmitted to the terminal device.

43. The method according to paragraph 42, wherein how frequently wireless traffic is received from or transmitted to the terminal device comprises one or more of:
a number of times the terminal device was scheduled to receive wireless traffic within a time period; and a number of times the terminal device was scheduled to receive wireless traffic within a time period during a current on duration period of the DRX mode.

44. The method according to any one of paragraphs 34 to 43, wherein the step of selecting the duration based on a characteristic of wireless traffic received or transmitted by the terminal device comprises selecting a first duration for the inactivity timer for wireless traffic received from or transmitted to the terminal device in accordance with a first characteristic, and selecting a second duration for the inactivity timer for wireless traffic received from or transmitted to the terminal device in accordance with a second characteristic, wherein the inactivity timer is started upon receiving or transmitting one or more wireless communications in accordance with the first characteristic, the method further comprising:
while the inactivity timer is running, receiving or transmitting one or more wireless communications in accordance with the second characteristic;
determining a remaining duration of the inactivity timer; and
responsive to a determination that the remaining duration is greater than the second duration, allowing the inactivity timer to continue without resetting or restarting it.

45. The method according to any one of paragraphs 34 to 44, wherein the step of selecting the duration based on a characteristic of wireless traffic received or transmitted by the terminal device comprises selecting a first duration for the inactivity timer for wireless traffic received from or transmitted to the terminal device in accordance with a first characteristic, and selecting a second duration for the inactivity timer for wireless traffic received from or transmitted to the terminal device in accordance with a second characteristic.

46. The method according to paragraph 45, wherein the step of selecting the duration based on a characteristic of wireless traffic comprises selecting a duration that is one of:
a maximum of the first and second durations;
a minimum of the first and second durations; and
a mean average of the first and second durations.

47. A terminal device configured to carry out the method according to any one of paragraphs 1 to 26.

48. A network node configured to carry out the method according to any one of paragraphs 27 to 46.

49. A terminal device, comprising processor circuitry and a computer-readable storage medium, the terminal device being operable in one or more modes, the one or more modes including one or more discontinuous reception, DRX, modes the computer-readable storage medium storing instructions that are executable by the processor circuitry whereby the terminal device is operative to:
select a duration for an inactivity timer of the DRX mode;
upon receiving or transmitting one or more wireless communications, start the inactivity timer; and
responsive to a determination that the duration for the inactivity timer has expired without the terminal device receiving or transmitting one or more further wireless communications, enter a DRX sleep state.

50. The terminal device according to paragraph 49, wherein the terminal device is operative to select the duration for the inactivity timer by selecting the duration from a plurality of different durations.

51. The terminal device according to paragraph 50, wherein the plurality of different durations are defined in RRC signaling from a network node to the terminal device.

52. The terminal device according to any one of paragraphs 48 to 50, wherein the terminal device is operative to select the duration for the inactivity timer by selecting the duration based on an indication in a wireless control signal received from a network node.

53. The terminal device according to paragraph 52, wherein the wireless control signal comprises a MAC signal.

54. The terminal device according to paragraph 52 or 53, wherein the indication comprises a value for the duration.

55. The terminal device according to paragraph 52 or 53, wherein the indication comprises an index which is mappable by the terminal device to a value for the duration.

56. The terminal device according to paragraph 55, wherein the terminal device is preconfigured with a mapping between a plurality of indices and corresponding duration values.

57. The terminal device according to paragraph 55, wherein a mapping between a plurality of indices and corresponding duration values is received by the terminal device in one or more wireless communications from a network node of the wireless communications network.

58. The terminal device according to paragraph 57, wherein the one or more wireless communications from the network node comprise RRC signals.

59. The terminal device according to any one of paragraphs 52 to 59, wherein the terminal device is operative to apply the duration for the inactivity timer based on the indication for a limited period of time.

60. The terminal device according to any one of paragraphs 48 to 50, wherein the step of selecting the duration for the inactivity timer comprises selecting the duration based on a characteristic of wireless traffic received or transmitted by the terminal device.

61. The terminal device according to paragraph 60, wherein the terminal device is operative to select the duration based on a characteristic of wireless traffic received or transmitted by the terminal device by selecting the duration based on a characteristic of wireless traffic on which the terminal device is currently active.

62. The terminal device according to paragraph 61, wherein the terminal device is operative to select the duration based on a characteristic of wireless traffic received or transmitted by the terminal device by:
  determining a characteristic of the one or more wireless communications upon which the inactivity timer is started; and
  selecting the duration based on the determined characteristic.

63. The terminal device according to any one of paragraphs 60 to 62, wherein the characteristic of wireless traffic comprises a type of wireless traffic.

64. The terminal device according to paragraph 63, wherein terminal device is operative to select the duration for the inactivity timer by selecting a first duration value for a first type of wireless traffic; and a second, different duration value for a second type of wireless traffic.

65. The terminal device according to paragraph 63 or 64, wherein the terminal device is further operative to determine the type of wireless traffic based on the radio bearer over which the wireless traffic is received or transmitted.

66. The terminal device according to any one of paragraphs 63 to 65, wherein the type of wireless traffic comprises one or more of: file transfer protocol, FTP, traffic; and voice traffic.

67. The terminal device according to paragraph 66, wherein the terminal device is operative to select the duration based on a characteristic of wireless traffic by selecting the first duration value when the terminal device has received or transmitted FTP traffic, and the second duration value when the terminal device has received or transmitted voice traffic, wherein the second duration value is smaller than the first duration value.

68. The terminal device according to any one of paragraphs 60 to 67, wherein the characteristic of wireless traffic comprises one or more of: a quality of service for the wireless traffic; a type of radio bearer over which the wireless traffic is transmitted or received; an amount of data ready for uplink, UL, transmission by the terminal device; a logical channel of the wireless traffic.

69. The terminal device according to any one of paragraphs 60 to 68, wherein the characteristic of wireless traffic received or transmitted by the terminal device comprises how frequently the wireless traffic is received or transmitted by the terminal device.

70. The terminal device according to paragraph 69, wherein how frequently wireless traffic is received or transmitted by the terminal device comprises one or more of:
  a number of times the terminal device was scheduled to receive wireless traffic within a time period; and a number of times the terminal device was scheduled to receive wireless traffic within a time period during a current on duration period of the DRX mode.

71. The terminal device according to any one of paragraphs 60 to 70, wherein the terminal device is operative to select the duration based on a characteristic of wireless traffic received or transmitted by the terminal device by selecting a first duration for the inactivity timer for wireless traffic received or transmitted by the terminal device in accordance with a first characteristic, and selecting a second duration for the inactivity timer for wireless traffic received or transmitted by the terminal device in accordance with a second characteristic, wherein the inactivity timer is started upon receiving or transmitting one or more wireless communications in accordance with the first characteristic, the terminal device being further operative to:
  while the inactivity timer is running, receive or transmit one or more wireless communications in accordance with the second characteristic;
  determine a remaining duration of the inactivity timer; and
  responsive to a determination that the remaining duration is greater than the second duration, allow the inactivity timer to continue without resetting or restarting it.

72. The terminal device according to any one of paragraphs 60 to 71, wherein terminal device is operative to select the duration based on a characteristic of wireless traffic received or transmitted by the terminal device by selecting a first duration for the inactivity timer for wireless traffic received or transmitted by the terminal device in accordance with a first characteristic, and selecting a second duration for the inactivity timer for wireless traffic received or transmitted by the terminal device in accordance with a second characteristic.

73. The terminal device according to paragraph 72, wherein the terminal device is further operative to select the duration based on a characteristic of wireless traffic by selecting a duration that is one of:
  a maximum of the first and second durations;
  a minimum of the first and second durations; and
  a mean average of the first and second durations.

74. The terminal device according to any one of paragraphs 49 to 73, where the one or more further wireless communications do not include retransmissions of wireless communications.

75. A network node comprising processor circuitry and a computer-readable storage medium, the computer-readable storage medium storing instructions that are executable by the processor circuitry whereby the network node is operative to:

select a duration for an inactivity timer for use by a terminal device in entering the DRX mode; and
initiate transmission of a control signal to the terminal device, the control signal containing an indication of the selected duration.

76. The network node according to paragraph 75, wherein the network node is operative to select the duration for the inactivity timer by selecting the duration from a plurality of different durations.

77. The network node according to paragraph 76, wherein the plurality of different durations are defined in the RRC context for the terminal device.

78. The network node according to any one of paragraphs 75 to 77, wherein the control signal comprises a MAC signal.

79. The network node according to any one of paragraphs 75 to 78, wherein the indication comprises a value for the duration.

80. The network node according to any one of paragraphs 75 to 78, wherein the indication comprises an index which is mappable by the terminal device to a value for the duration.

81. The network node according to paragraph 80, wherein the network node is further operative to:
initiate transmission to the terminal device of a wireless signal comprising a mapping between a plurality of indices and corresponding duration values.

82. The network node according to any one of paragraphs 75 to 81, wherein the network node is operative to select the duration for the inactivity timer comprises selecting the duration based on a characteristic of wireless traffic received from or transmitted to the terminal device.

83. The network node according to paragraph 82, wherein the network node is operative to select the duration based on a characteristic of wireless traffic received from or transmitted to the terminal device by selecting the duration based on a characteristic of wireless traffic on which the terminal device is currently active.

84. The network node according to paragraph 82 or 83, wherein the characteristic of wireless traffic comprises a type of wireless traffic.

85. The network node according to paragraph 84, wherein the network node is operative to select the duration for the inactivity timer by selecting a first duration value for a first type of wireless traffic; and a second, different duration value for a second type of wireless traffic.

86. The network node according to paragraph 84 or 85, wherein the network node is operative to determine the type of wireless traffic based on the radio bearer over which the wireless traffic is received or transmitted.

87. The network node according to any one of paragraphs 84 to 86, wherein the type of wireless traffic comprises one or more of: file transfer protocol, FTP, traffic; and voice traffic.

88. The network node according to paragraph 87, wherein the network node is operative to select the duration based on a characteristic of wireless traffic by selecting the first duration value when FTP traffic is received from or transmitted to the terminal device, and the second duration value when voice traffic is received from or transmitted to the terminal device, wherein the second duration value is smaller than the first duration value.

89. The network node according to any one of paragraphs 82 to 88, wherein the characteristic of wireless traffic comprises one or more of: a quality of service for the wireless traffic; a type of radio bearer over which the wireless traffic is transmitted or received; an amount of data ready for uplink, UL, transmission by the terminal device.

90. The network node according to any one of paragraphs 82 to 89, wherein the characteristic of wireless traffic received from or transmitted to the terminal device comprises how frequently the wireless traffic is received from or transmitted to the terminal device.

91. The network node according to paragraph 90, wherein how frequently wireless traffic is received from or transmitted to the terminal device comprises one or more of:
a number of times the terminal device was scheduled to receive wireless traffic within a time period; and
a number of times the terminal device was scheduled to receive wireless traffic within a time period during a current on duration period of the DRX mode.

92. The network node according to any one of paragraphs 82 to 91, wherein the network node is operative to select the duration based on a characteristic of wireless traffic received or transmitted by the terminal device by selecting a first duration for the inactivity timer for wireless traffic received from or transmitted to the terminal device in accordance with a first characteristic, and selecting a second duration for the inactivity timer for wireless traffic received from or transmitted to the terminal device in accordance with a second characteristic, wherein the inactivity timer is started upon receiving or transmitting one or more wireless communications in accordance with the first characteristic, and wherein the network node is further operative to:
while the inactivity timer is running, receive or transmit one or more wireless communications in accordance with the second characteristic;
determine a remaining duration of the inactivity timer; and
responsive to a determination that the remaining duration is greater than the second duration, allow the inactivity timer to continue without resetting or restarting it.

93. The network node according to any one of paragraphs 82 to 92, wherein the network node is operative to select the duration based on a characteristic of wireless traffic received or transmitted by the terminal device by selecting a first duration for the inactivity timer for wireless traffic received from or transmitted to the terminal device in accordance with a first characteristic, and selecting a second duration for the inactivity timer for wireless traffic received from or transmitted to the terminal device in accordance with a second characteristic.

94. The network node according to paragraph 93, wherein the network node is operative to select the duration based on a characteristic of wireless traffic by selecting a duration that is one of:
a maximum of the first and second durations;
a minimum of the first and second durations; and
a mean average of the first and second durations.

95. A terminal device for a wireless communication network, the terminal device being operable in one or more modes, the one or more modes including one or more discontinuous reception, DRX, modes, the terminal device comprising:
a first module configured to select a duration for an inactivity timer of the DRX mode;
a second module configured to, upon receiving or transmitting one or more wireless communications, start the inactivity timer; and
a third module configured to, responsive to a determination that the duration for the inactivity timer has expired without the terminal device receiving or transmitting one or more further wireless communications, control the terminal device to enter a DRX sleep state.

96. A network node for a wireless communication network, the wireless communication network further comprising a terminal device, the network node comprising:
a first module configured to select a duration for an inactivity timer for use by the terminal device in entering the DRX mode; and
a second module configured to initiate transmission of a control signal to the terminal device, the control signal containing an indication of the selected duration.

The invention claimed is:

1. A method of operating a terminal device of a wireless communications network, the terminal device being operable in one or more modes, the one or more modes including one or more discontinuous reception, DRX, modes, the method comprising:
selecting a duration for an inactivity timer of the DRX mode based on a characteristic of wireless traffic received or transmitted by the terminal device by selecting a first duration for the inactivity timer for wireless traffic received or transmitted by the terminal device in accordance with a first characteristic, and selecting a second duration for the inactivity timer for wireless traffic received or transmitted by the terminal device in accordance with a second characteristic;
upon receiving or transmitting one or more wireless communications, starting the inactivity timer; and
responsive to a determination that the duration for the inactivity timer has expired without the terminal device receiving or transmitting one or more further wireless communications, entering a DRX sleep state;
where the inactivity timer is started upon receiving or transmitting the one or more wireless communications in accordance with the first characteristic, the method further comprising:
while the inactivity timer is running, receiving or transmitting the one or more wireless communications in accordance with the second characteristic;
determining a remaining duration of the inactivity timer; and
responsive to a determination that the remaining duration is greater than the second duration, allowing the inactivity timer to continue without resetting or restarting the inactivity timer.

2. The method according to claim 1, wherein the step of selecting the duration for the inactivity timer comprises selecting the duration from a plurality of different durations.

3. The method according to claim 2, wherein the plurality of different durations are defined in RRC signalling from a network node of the wireless communications network to the terminal device.

4. The method according to claim 1, wherein the step of selecting the duration based on a characteristic of wireless traffic received or transmitted by the terminal device comprises selecting the duration based on a characteristic of wireless traffic on which the terminal device is currently active.

5. The method according to claim 4, wherein the step of selecting the duration based on a characteristic of wireless traffic received or transmitted by the terminal device comprises:
determining a characteristic of the one or more wireless communications upon which the inactivity timer is started; and
selecting the duration based on the determined characteristic.

6. The method according to claim 1, wherein the characteristic of wireless traffic comprises a type of wireless traffic.

7. The method according to claim 6, wherein the step of selecting the duration for the inactivity timer comprises selecting a first duration value for a first type of wireless traffic; and a second, different duration value for a second type of wireless traffic.

8. The method according to claim 6, wherein the type of wireless traffic is determined based on the radio bearer over which the wireless traffic is received or transmitted.

9. The method according to claim 6, wherein the type of wireless traffic comprises one or more of: file transfer protocol, FTP, traffic; and voice traffic.

10. The method according to claim 9, wherein the step of selecting the duration based on a characteristic of wireless traffic comprises selecting the first duration value when the terminal device has received or transmitted FTP traffic, and the second duration value when the terminal device has received or transmitted voice traffic, wherein the second duration value is smaller than the first duration value.

11. The method according to claim 1, wherein the characteristic of wireless traffic comprises one or more of: a quality of service for the wireless traffic; a type of radio bearer over which the wireless traffic is transmitted or received; an amount of data ready for uplink, UL, transmission by the terminal device; and a logical channel of the wireless traffic.

12. The method according to claim 1, wherein the characteristic of wireless traffic received or transmitted by the terminal device comprises how frequently the wireless traffic is received or transmitted by the terminal device.

13. The method according to claim 12, wherein how frequently wireless traffic is received or transmitted by the terminal device comprises one or more of:
a number of times the terminal device was scheduled to receive wireless traffic within a time period; and
a number of times the terminal device was scheduled to receive wireless traffic within a time period during a current on duration period of the DRX mode.

14. The method according to claim 1, wherein the step of selecting the duration based on a characteristic of wireless traffic comprises selecting a duration that is one of:
a maximum of the first and second durations;
a minimum of the first and second durations; and
a mean average of the first and second durations.

15. The method according to claim 1, wherein the step of selecting the duration for the inactivity timer comprises selecting the duration based on an indication in a wireless control signal received from a network node of the wireless communications network.

16. The method according to claim 15, wherein the wireless control signal comprises a MAC signal.

17. The method according to claim 1, wherein the one or more further wireless communications do not include retransmissions of wireless communications.

18. A method of operating a network node of a wireless communications network, the wireless communications network further comprising a terminal device being operable in one or more modes, the one or more modes including one or more discontinuous reception, DRX, modes, the method comprising:
selecting a duration for an inactivity timer for use by the terminal device in entering the DRX mode based on a characteristic of wireless traffic received from or transmitted to the terminal device by selecting a first duration for the inactivity timer for wireless traffic received from or transmitted to the terminal device in accordance with a first characteristic, and selecting a second duration for the inactivity timer for wireless traffic received from or transmitted to the terminal device in accordance with a second characteristic; and initiating transmission of a control signal to the terminal device, the control signal containing an indication of the selected duration;

where the inactivity timer is started upon receiving or transmitting one or more wireless communications in accordance with the first characteristic, the method further comprising:

while the inactivity timer is running, receiving or transmitting the one or more wireless communications in accordance with the second characteristic;

determining a remaining duration of the inactivity timer; and responsive to a determination that the remaining duration is greater than the second duration, allowing the inactivity timer to continue without resetting or restarting it.

19. The method according to claim 18, wherein the step of selecting the duration based on a characteristic of wireless traffic received from or transmitted to the terminal device comprises selecting the duration based on a characteristic of wireless traffic on which the terminal device is currently active.

20. The method according to claim 18, wherein the characteristic of wireless traffic comprises a type of wireless traffic.

21. The method according to claim 20, wherein the step of selecting the duration for the inactivity timer comprises selecting a first duration value for a first type of wireless traffic; and a second, different duration value for a second type of wireless traffic.

22. The method according to claim 20, wherein the type of wireless traffic is determined based on the radio bearer over which the wireless traffic is received or transmitted.

23. The method according to claim 20, wherein the type of wireless traffic comprises one or more of: file transfer protocol, FTP, traffic; and voice traffic.

24. The method according to claim 23, wherein the step of selecting the duration based on a characteristic of wireless traffic comprises selecting the first duration value when FTP traffic is received from or transmitted to the terminal device, and the second duration value when voice traffic is received from or transmitted to the terminal device, wherein the second duration value is smaller than the first duration value.

25. The method according to claim 18, wherein the characteristic of wireless traffic comprises one or more of: a quality of service for the wireless traffic; a type of radio bearer over which the wireless traffic is transmitted or received; an amount of data ready for uplink, UL, transmission by the terminal device.

26. The method according to claim 18, wherein the characteristic of wireless traffic received from or transmitted to the terminal device comprises how frequently the wireless traffic is received from or transmitted to the terminal device.

27. The method according to claim 26, wherein how frequently wireless traffic is received from or transmitted to the terminal device comprises one or more of:

a number of times the terminal device was scheduled to receive wireless traffic within a time period; and a number of times the terminal device was scheduled to receive wireless traffic within a time period during a current on duration period of the DRX mode.

28. The method according to claim 18, wherein the step of selecting the duration based on a characteristic of wireless traffic comprises selecting a duration that is one of:

a maximum of the first and second durations;
a minimum of the first and second durations; and
a mean average of the first and second durations.

29. The method according to claim 18, wherein the step of selecting the duration for the inactivity timer comprises selecting the duration from a plurality of different durations.

30. The method according to claim 18, wherein the control signal comprises a MAC signal.

31. A terminal device, comprising processor circuitry and a non-transitory computer-readable storage medium, the terminal device being operable in one or more modes, the one or more modes including one or more discontinuous reception, DRX, modes the non-transitory computer-readable storage medium storing instructions that are executable by the processor circuitry whereby the terminal device is operative to:

select a duration for an inactivity timer of the DRX mode based on a characteristic of wireless traffic received or transmitted by the terminal device by being operative to select a first duration for the inactivity timer for wireless traffic received or transmitted by the terminal device in accordance with a first characteristic, and selecting a second duration for the inactivity timer for wireless traffic received or transmitted by the terminal device in accordance with a second characteristic;

upon receiving or transmitting one or more wireless communications, start the inactivity timer; and responsive to a determination that the duration for the inactivity timer has expired without the terminal device receiving or transmitting one or more further wireless communications, enter a DRX sleep state;

where the inactivity timer is started upon receiving or transmitting the one or more wireless communications in accordance with the first characteristic, the method further comprising:

while the inactivity timer is running, receiving or transmitting the one or more wireless communications in accordance with the second characteristic;

determining a remaining duration of the inactivity timer; and responsive to a determination that the remaining duration is greater than the second duration, allowing the inactivity timer to continue without resetting or restarting the inactivity timer.

32. A network node comprising processor circuitry and a non-transitory computer-readable storage medium, the non-transitory computer-readable storage medium storing instructions that are executable by the processor circuitry whereby the network node is operative to:

select a duration for an inactivity timer for use by a terminal device in entering the DRX mode based on a characteristic of wireless traffic received from or transmitted to the terminal device by being operative to select a first duration for the inactivity timer for wireless traffic received from or transmitted to the terminal device in accordance with a first characteristic, and selecting a second duration for the inactivity timer for wireless traffic received from or transmitted to the terminal device in accordance with a second characteristic; and initiate transmission of a control signal to the terminal device, the control signal containing an indication of the selected duration;

where the inactivity timer is started upon receiving or transmitting one or more wireless communications in accordance with the first characteristic, the method further comprising:
   while the inactivity timer is running, receiving or transmitting the one or more wireless communications in accordance with the second characteristic;
   determining a remaining duration of the inactivity timer; and
   responsive to a determination that the remaining duration is greater than the second duration, allowing the inactivity timer to continue without resetting or restarting it.

33. A method of operating a terminal device of a wireless communications network, the terminal device being operable in one or more modes, the one or more modes including one or more discontinuous reception, DRX, modes, the method comprising:
   selecting a duration for an inactivity timer of the DRX mode based on a characteristic of wireless traffic received or transmitted by the terminal device by selecting a first duration for the inactivity timer for wireless traffic received or transmitted by the terminal device in accordance with a first characteristic, and selecting a second duration for the inactivity timer for wireless traffic received or transmitted by the terminal device in accordance with a second characteristic;
   upon receiving or transmitting one or more wireless communications, starting the inactivity timer; and
   responsive to a determination that the duration for the inactivity timer has expired without the terminal device receiving or transmitting one or more further wireless communications, entering a DRX sleep state;
   where the step of selecting the duration based on a characteristic of wireless traffic comprises selecting a duration that is one of:
      a maximum of the first and second durations;
      a minimum of the first and second durations; and
      a mean average of the first and second durations.

* * * * *